July 18, 1933.  C. E. HINCKLEY ET AL  1,918,268

TOOL

Filed Feb. 3, 1930  2 Sheets-Sheet 1

INVENTORS
CHESTER E. HINCKLEY
BY REESE GREEN
ATTORNEY

July 18, 1933.  C. E. HINCKLEY ET AL  1,918,268

TOOL

Filed Feb. 3, 1930  2 Sheets-Sheet 2

INVENTORS
CHESTER E. HINCKLEY
REESE GREEN.
BY
*Lee Allan Severn*
ATTORNEY

Patented July 18, 1933

1,918,268

UNITED STATES PATENT OFFICE

CHESTER E. HINCKLEY AND REESE GREEN, OF YALE, OKLAHOMA, ASSIGNORS TO MAGNOLIA PETROLEUM COMPANY, OF DALLAS, TEXAS, A CORPORATION OF TEXAS

TOOL

Application filed February 3, 1930. Serial No. 425,419.

This invention relates to tools, more particularly to tools adapted to facilitate the assembly of machine or other elements or parts, and to cutting tools.

In its preferred form, the invention is adapted to facilitate the assembly of an internal combustion engine piston, piston pin and connecting rod of the type in which the piston pin is retained in assembled position by means of a split resilient ring carried by the connecting rod and engaging in a groove in the piston pin, and is further adapted to face the piston pin bosses on a piston.

One of the objects of the invention is to provide a tool of simple construction which is adapted to facilitate the assembly of machine or other elements or parts, one of which has a working bearing in another or others and is retained therein by means of a comparatively stiff spring member.

Another object of the invention is to provide a tool of simple construction which is adapted to aid in the quick and easy assembly of a piston, piston pin and connecting rod of the character referred to.

A further object is to provide a tool adapted to facilitate the assembly of a piston, piston pin and connecting rod of the type referred to and which may also be utilized to face the piston pin bosses of a piston.

Figure 1:
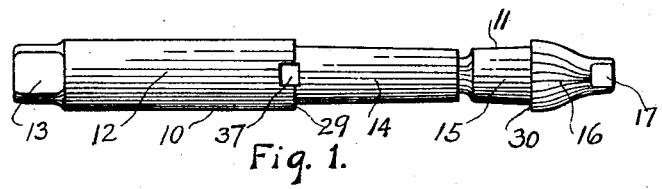
Figure 2:
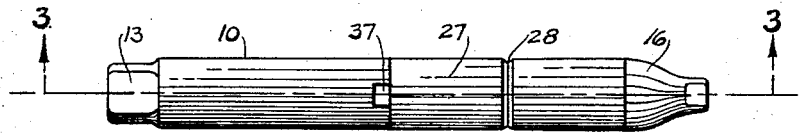
Figure 3:
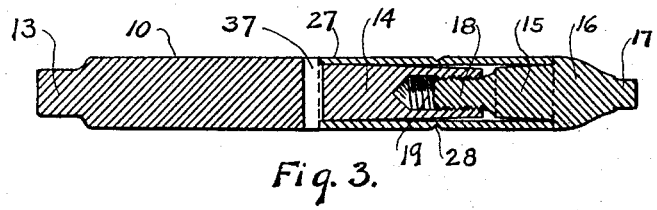
Figure 4:
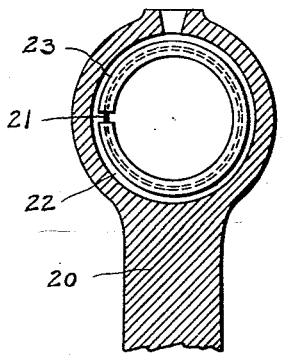
Figure 5:
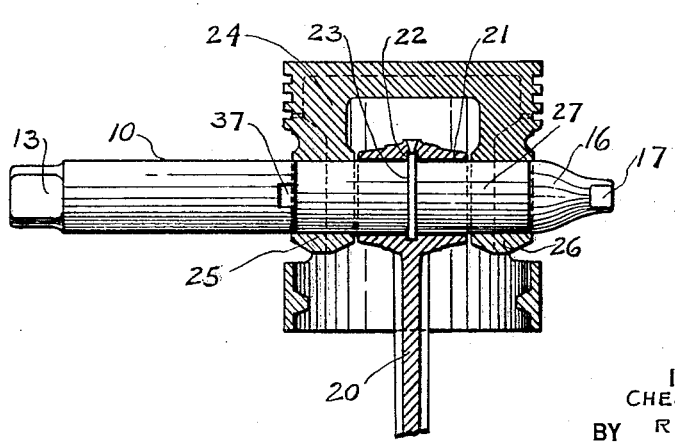
Figure 6:
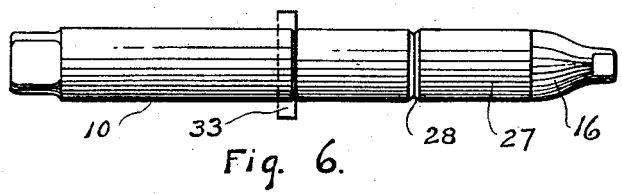
Figure 7:
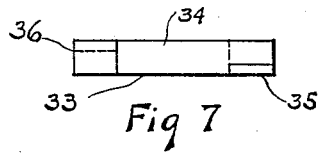
Figure 8:
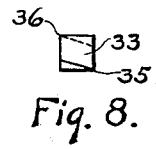
Figure 9:
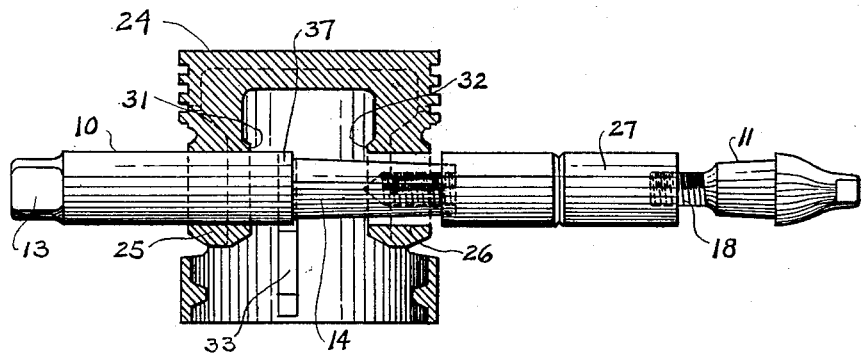
Figure 10:
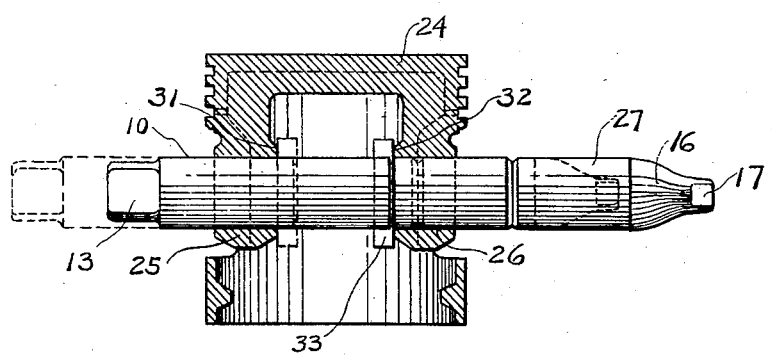

These and other objects of the invention will be apparent from the following description taken in connection with the accompanying drawings illustrating the preferred form of the invention, in which:

Fig. 1 is an elevational view of a tool constructed in accordance with the present invention, Fig. 2 is a view in elevation of the tool with a piston pin mounted and secured thereon, Fig. 3 is a sectional view taken on line 3—3 of Fig. 2, Fig. 4 is an enlarged view of the upper end of a connecting rod of the type referred to, showing the resilient retaining ring mounted therein, Fig. 5 is a view, partly in section and partly in elevation, of a piston, piston pin and connecting rod assembly, with the piston pin mounted on the tool, Fig. 6 is an elevational view of the tool with a cutting tool and a piston pin secured thereon, Fig. 7 is an elevational view of a cutting tool suitable for use with the tool, Fig. 8 is an end view of the cutting tool, Fig. 9 is a sectional view of a piston illustrating the method of assembling the tool in the piston pin bosses to effect the facing of the bosses, and Fig. 10 is a view of a piston in section with the tool in full lines in position for facing one of the piston pin bosses, and in dotted lines in position for facing the other boss.

Referring to the drawings, the tool constructed in accordance with the present invention preferably consists of two detachably connected parts 10 and 11. The part 10 has a cylindrical body portion 12 provided with a flattened extension 13 by which the tool may be clamped in a vise or engaged by a wrench, and a cylindrical tapering portion 14. The part 11 is also provided with a cylindrical tapering portion 15, preferably relatively shorter than the portion 14 of part 10, a cam portion 16 of preferably circular transverse cross-section having a flattened extension 17 and a threaded portion 18 adapted to thread into the threaded aperture 19 in part 10. The diameter of the cylindrical body portion 12 of part 10 and the greatest diameter of the cam portion 16 of part 11 are preferably equal to the outside diameter of the piston pin with which the tool is to be used.

The tool is particularly suited to facilitating the assembly of a piston, piston pin and connecting rod of the character shown in Figs. 4 and 5 of the drawings. In this construction the upper end of the connecting rod 20 is provided with the usual piston pin bushing or bearing 21, carrying in an annular groove 22 therein, a comparatively stiff split spring ring 23 which is adapted to engage the piston pin and retain it in assembled position. The piston, indicated generally at 24 is provided with the usual piston pin bosses 25 and 26, and the piston pin 27 of the customary tubular form, has an annular groove 28 midway between the ends thereof.

To effect the assembly of these parts by utilizing the tool of the present invention, the piston pin 27 is first placed on the cylindrical tapering portion 14 of part 10 of the tool, with one end of the piston pin in contact with the shoulder 29 as shown, after which the threaded and tapering portions of the part 11 are inserted in the other end of the piston pin and the threaded portion 18 is threaded into part 10 until the shoulder 30 is tight against the end of the piston pin as shown in Figs. 2 and 3. The assembled tool and piston pin are next preferably clamped in a suitable vise, not shown, with the jaws of the vise engaging the flattened extension 13. The piston and connecting rod are then pressed onto the tool so that the tool and the piston pin enter the piston pin bosses 25 and 26 and the piston pin bearing 21 in the connecting rod. During this movement, the cam portion 16 of part 11 of the tool will be forced into the resilient or spring ring 23 and readily expand the ring sufficiently to permit the piston pin to be readily moved through it until the ring snaps into the piston pin groove 28, as shown in Fig. 5. The tool parts 10 and 11 are then disconnected and withdrawn from the piston pin. If desired, the parts may, of course, be assembled by suitably holding the piston and connecting rod and pressing the assembled tool and piston pin into the piston pin bosses and connecting rod bearing in lieu of clamping the tool in a vise as described.

The tool may also be utilized for facing, or removing metal from, the inner faces 31 and 32 of the piston pin bosses. For this purpose a cutting member or tool 33 having a body portion 34 of preferably rectangular cross-section and oppositely disposed cutting edges 35 and 36 at the ends thereof is mounted on part 10 of the tool in a suitable aperture 37 located principally in the cylindrical body portion 12 but extending somewhat over into the tapering portion 14 as shown. The cutting tool 33 is secured in position on the part 10 by means of the piston pin 27 which is mounted on the tapering portion 14 of tool part 10 and is forced against the cutting tool by the part 11 as previously described and as shown in Fig. 6.

In assembling the parts to face the piston pin bosses, however, part 11 alone is inserted, tapering portion 15 first, in one of the bosses, boss 25 for example, until the cutting tool aperture 37 is intermediate the boss faces 31 and 32, as shown in Fig. 9. Cutting tool 33 is then inserted in aperture 37 from the bottom of the piston, after which the piston pin is pressed into the other boss 26 and onto the tapering portion 14 until the end of the piston pin is in contact with the cutting tool. The threaded portion of part 11 is then threaded into the part 10 and turned up tightly to secure the cutting tool and piston pin in position. The cutting may then be done either by holding the piston and turning the tool by a wrench or other suitable means engaging the flattened extension 13 or by clamping the tool in a suitable vise and turning the piston. In the same manner the outer faces of the bosses 25 and 26 may also be faced, and for this purpose the tool may, if desired, be completely assembled before being inserted in the bosses.

By using a cutting tool having oppositely disposed cutting edges as described, both bosses of the piston may be faced without removing the tool from the bosses or the cutter from the tool by simply moving the tool axially in the piston pin bosses so that the cutting tool moves from contact with the face of one of the bosses into contact with the face of the other, as shown in full and dotted lines in Fig. 10. With this arrangement, the necessity for the use of a special reamer to face the piston pin bosses is obviated.

The tool thus provided is of extremely simple construction, is economical to produce and is easily used. Its use in the manner described accomplishes the quick and easy assembly of the parts and its additional utility as a cutting tool obviates the necessity of using a special cutting tool or reamer.

Since the invention may be utilized in ways other than that set forth, and since many changes might be made in the form of the invention shown and described, it is understood that the form described and illustrated herein is to be considered a preferred form only, and that the invention is not to be limited except by the scope of the appended claim.

Having thus described our invention, what we claim as new and desire to secure by Letters Patent is:—

A tool adapted to face the pin bosses of a piston, comprising a part having a cylindrical portion of approximately the diameter of a piston pin to be mounted in the bosses, a cylindrical tapering portion and an aperture extending through the part, a cutting tool mounted on the part in the aperture, a piston pin adapted to be assembled in the pin bosses mounted on the cylindrical portion with one end thereof in contact with the cutting tool, and means for engaging the cylindrical tapering portion of the tool part for securing the piston pin and cutting tool thereon.

CHESTER E. HINCKLEY.
REESE GREEN.